United States Patent
Rapaich

(10) Patent No.: US 6,502,142 B1
(45) Date of Patent: Dec. 31, 2002

(54) MULTIPLE AUDIO AND VIDEO SIGNAL ROUTING WITH PC COMPATIBILITY

(75) Inventor: Mark Rapaich, Westfield, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/217,390

(22) Filed: Dec. 21, 1998

(51) Int. Cl.[7] .............................................. H04N 7/10
(52) U.S. Cl. .............................................. 710/1; 348/8
(58) Field of Search ........................... 710/1; 345/327; 370/260; 395/311, 200; 348/15, 375, 8

(56) References Cited

U.S. PATENT DOCUMENTS

| | | | | |
|---|---|---|---|---|
| 5,307,456 A | * | 4/1994 | MacKay | 395/154 |
| 5,666,291 A | * | 9/1997 | Scott et al. | 395/200 |
| 5,737,011 A | * | 4/1998 | Lukacs | 348/15 |
| 5,784,457 A | | 7/1998 | Haba | 379/421 |
| 5,802,281 A | * | 9/1998 | Clapp et al. | 395/200 |
| 5,844,606 A | * | 12/1998 | Suemoto et al. | 348/375 |
| 5,914,797 A | * | 6/1999 | Yamamoto et al. | 359/146 |
| 5,929,895 A | * | 7/1999 | Berry et al. | 348/8 |
| 5,937,176 A | * | 8/1999 | Beasley et al. | 395/311 |
| 5,963,246 A | * | 10/1999 | Kato | 348/15 |
| 6,241,610 B1 | * | 6/2001 | Miyamoto et al. | 463/33 |

FOREIGN PATENT DOCUMENTS

| | | | | |
|---|---|---|---|---|
| WO | 95/00917 | 1/1995 | | G06F/15/62 |
| WO | 97/00491 | 1/1997 | | G06F/19/00 |

OTHER PUBLICATIONS

All In Wonder Radeon 8500DV technical support article- (four pages).*
Press Release ATI's all in wonder one card(pp. 3).*

* cited by examiner

Primary Examiner—Bipin Shalwala
Assistant Examiner—Nitin Patel
(74) Attorney, Agent, or Firm—Scott Charles Richardson; John M. Dahl; Schwegman, Lundberg, Woessner & Kluth

(57) ABSTRACT

A controller on a card in a personal computer or set top box controls routing of multiple audio or video signals to multiple outputs concurrently. Also provided is the ability for the user to configure the controller via software or hardware controls, such as a multi-position switch located on the external surface of the computer hardware. Multiple different formats of video and audio are properly converted and routed.

23 Claims, 3 Drawing Sheets

MULTIPLE AUDIO AND VIDEO SIGNAL ROUTING WITH PC COMPATIBILITY

FIELD OF THE INVENTION

The present invention relates to handling of multimedia content in computer systems, and in particular to handling multiple audio and video signals concurrently in the same computer system.

BACKGROUND

Personal computers have long incorporated the ability to generate sound, and to allow a user to direct or control many aspects of sound production. The user may control the sources of sound, such as by configuring software to produce sound using a built-in audio adapter, or by playing sounds from an audio CD in a built-in CD-ROM drive. The user may also configure a typical computer system to play these sounds through a built-in speaker, or to provide the audio signal to an output port to which the user may attach speakers, an external amplifier, or a recording device.

The user is limited, however, to routing one audio signal from a single source to a single output. Personal computer systems often have several devices capable of producing audio, and typical audio adapters are capable of receiving sound from more than one source. However, the audio adapter cannot route audio signals from multiple sources to multiple outputs, but can only combine or mix audio signals and route them to a single output. For example, the user cannot route audio signals from a CD player to an external port for recording while listening to program-generated sounds through external speakers.

Recently, the ability of personal computers to route and display video signals has become common, and these video signals are often accompanied by corresponding audio signals. DVD players, program software, and television are a few examples of sources that generate video signals as well as audio signals, and are found within many home computers. Just as audio adapters typically provide a single audio output, the video hardware in personal computers provides only a single video output. The user may view multiple video sources at the same time by displaying the different video signals on different portions of the same video display device, but cannot route one video signal to one display device and another video signal to a different display device or output port.

Watching a DVD movie consisting of a video and audio signal on a display device while providing a separate video and audio signal from another source such as a computer program to a second display device cannot currently be done by personal computers. There is a need for such capability in a personal computer system. There is a further need for better audio and video signal routing capabilities such that multiple signals can be handled simultaneously.

SUMMARY OF THE INVENTION

A controller is provided to route multiple audio or video signals to multiple outputs concurrently. Also provided is the ability for the user to configure the controller such that selected signals are routed to selected outputs.

In one embodiment, the ability of the user to configure the controller to route selected signals to selected outputs takes the form of software running on the personal computer. Another embodiment provides the same function by providing the user with hardware controls, such as a multi-position switch located on the external surface of the computer hardware. The invention may also take the form of a controller in a set-top box or other computer logic device The invention may take the form of a controller that routes both video and an associated audio signal to a video port and an associated audio port concurrently. Video with accompanying audio is then routed by user specification of a source such as DVD that may contain both audio and video information, and user specification of a group of associated output ports that may provide both audio and video signals as outputs.

DETAILED DESCRIPTION

In the following description, reference is made to the accompanying drawings, which form a part of this description, and show by way of illustration specific embodiments in which the invention may be practiced. These embodiments are described in sufficient detail to enable those skilled in the art to practice the invention. Other embodiments may also be utilized to practice the invention, and structural, logical, and electrical changes may be made without departing from the scope of the present invention. The following description is, therefore, not to be taken in a limiting sense, and the scope of the present invention is defined by the appended claims.

Figure 1:
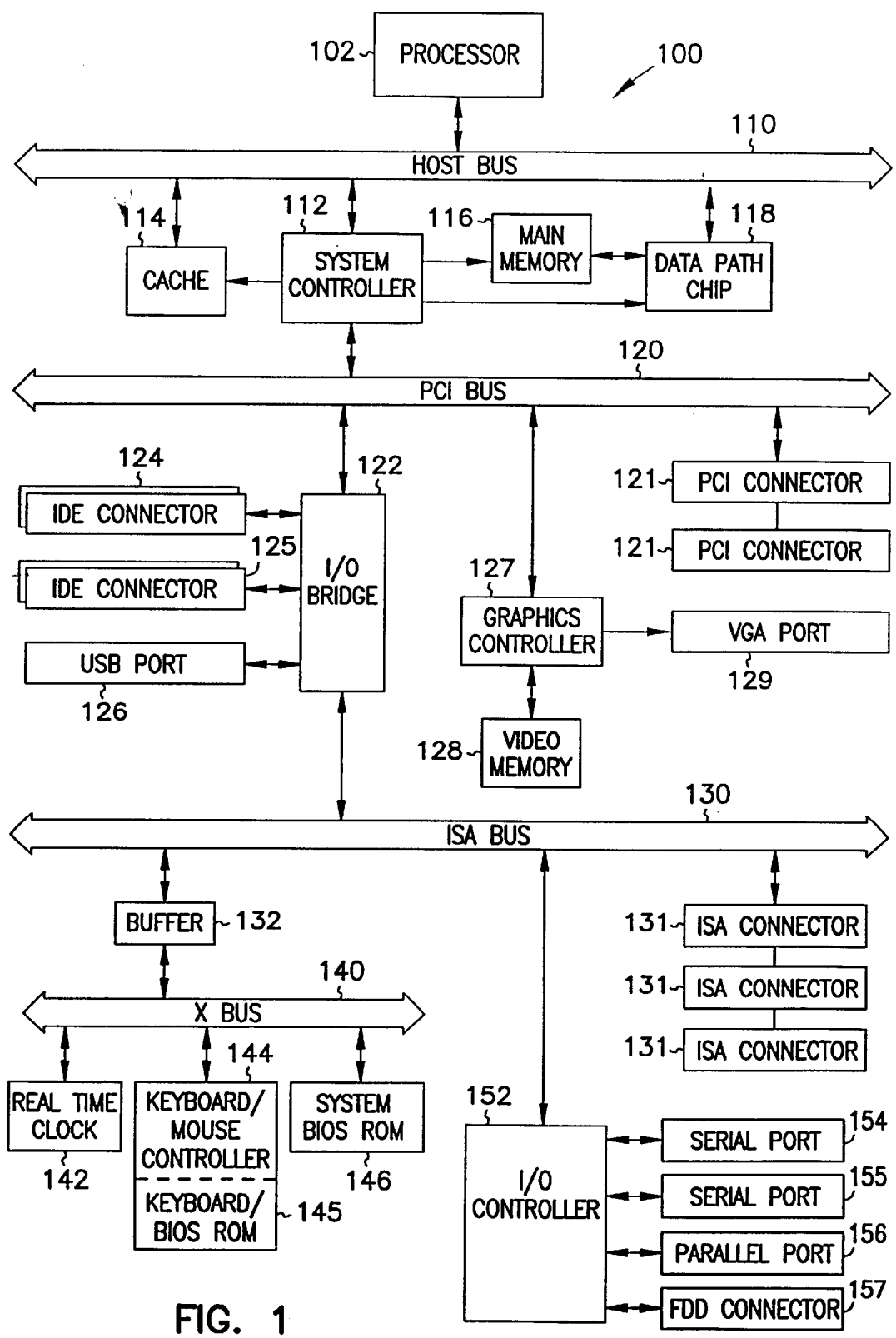
FIG. 1 is a block diagram of a personal computer incorporating the present invention

FIG. 1 shows a block diagram of a computer system 100 according to the present invention. In this embodiment, processor 102, system controller 112, cache 114, and data-path chip 118 are each coupled to host bus 110. Processor 102 is a microprocessor such as a 486-type chip, a Pentium®, Pentium II® or other suitable microprocessor. Cache 114 provides high-speed local-memory data (in one embodiment, for example, 512 kB of data) for processor 102, and is controlled by system controller 112, which loads cache 114 with data that is expected to be used soon after the data is placed in cache 112 (i.e., in the near future). Main memory 116 is coupled between system controller 114 and data-path chip 118, and in one embodiment, provides random-access memory of between 16 MB and 128 MB of data. In one embodiment, main memory 116 is provided on SIMMs (Single In-line Memory Modules), while in another embodiment, main memory 116 is provided on DIMMs (Dual In-line Memory Modules), each of which plugs into suitable sockets provided on a motherboard holding many of the other components shown in FIG. 1. Main memory 116 includes standard DRAM (Dynamic Random-Access Memory), EDO (Extended Data Out) DRAM, SDRAM (Synchronous DRAM), or other suitable memory technology. System controller 112 controls PCI (Peripheral Component Interconnect) bus 120, a local bus for system 100 that provides a high-speed data path between processor 102 and various peripheral devices, such as graphics devices, storage drives, network cabling, etc. Data-path chip 118 is also controlled by system controller 112 to assist in routing data between main memory 116, host bus 110, and PCI bus 120.

In one embodiment, PCI bus 120 provides a 32-bit-wide data path that runs at 33 MHZ. In another embodiment, PCI bus 120 provides a 64-bit-wide data path that runs at 33 MHZ. In yet other embodiments, PCI bus 120 provides 32-bit-wide or 64-bit-wide data paths that run at higher speeds. In one embodiment, PCI bus 120 provides connectivity to I/O bridge 122, graphics controller 127, and one or more PCI connectors 121 (i.e., sockets into which a card edge may be inserted), each of which accepts a standard PCI card. In one embodiment, I/O bridge 122 and graphics controller 127 are each integrated on the motherboard along with system controller 112, in order to avoid a board-connector-board signal-crossing interface and thus provide better speed and reliability. In the embodiment shown, graphics controller 127 is coupled to a video memory 128 (that includes memory such as DRAM, EDO DRAM, SDRAM, or VRAM (Video Random-Access Memory)), and drives VGA (Video Graphics Adaptor) port 129. VGA port 129 can connect to industry-standard monitors such as VGA-type, SVGA (Super VGA)-type, XGA-type (eXtended Graphics Adaptor) or SXGA-type (Super XGA) display devices. Other input/output (I/O) cards having a PCI interface can be plugged into PCI connectors 121.

In one embodiment, I/O bridge 122 is a chip that provides connection and control to one or more independent IDE connectors 124–125, to a USB (Universal Serial Bus) port 126, and to ISA (Industry Standard Architecture) bus 130. In this embodiment, IDE connector 124 provides connectivity for up to two standard IDE-type devices such as hard disk drives, CDROM (Compact Disk-Read-Only Memory) drives, DVD (Digital Video Disk) drives, or TBU (Tape-Backup Unit) devices. In one similar embodiment, two IDE connectors 124 are provided, and each provide the EIDE (Enhanced IDE) architecture. In the embodiment shown, SCSI (Small Computer System Interface) connector 125 provides connectivity for up to seven or fifteen SCSI-type devices (depending on the version of SCSI supported by the embodiment). In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146.

FIG. 1 shows one exemplary embodiment of the present invention, however other bus structures and memory arrangements are specifically contemplated.

Figure 2:
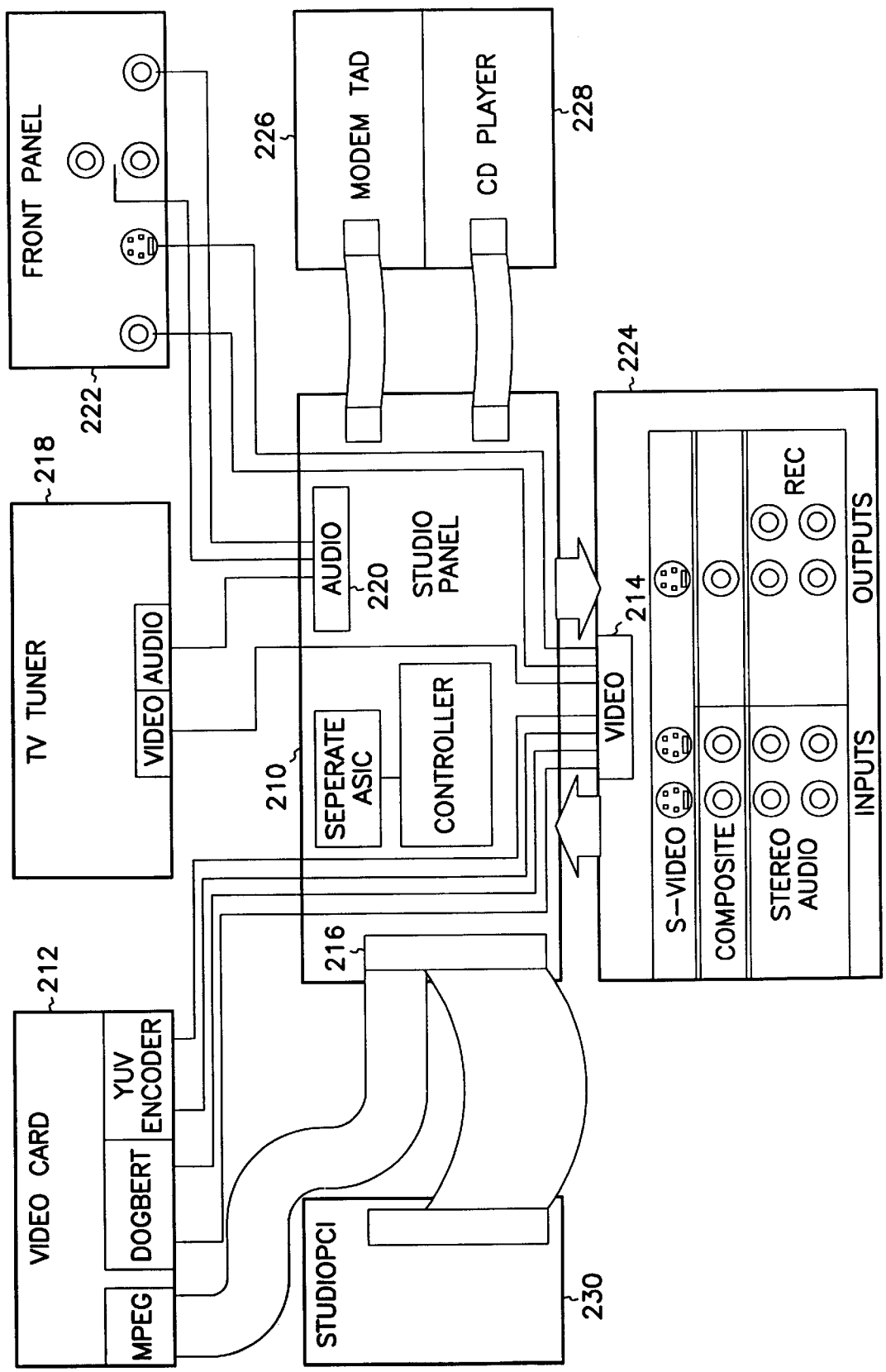
FIG. 2 is a high level block diagram of the personal computer of FIG. 1 illustrating multiple independent audio and video sources.

FIG. 2 shows a studio panel card 210 which is coupled to receive audio and video signals from multiple sources. The studio panel card 210 may be integrated into a personal computer as shown in FIG. 1, or just as easily into a set top box which interfaces with a television set or other display device. The studio panel card 210 is coupled to a video card 212 which provides YUV encoded video signals in both NTSC and S-video formats to a connector 214 on studio panel card 210. Video card 212 also provides MPEG signals to a digital connector 216 on the studio panel card 210, and non-encoded NTSC and S-video signals via connector 214 to studio panel card 210. Thus, multiple sets of different types of video signals are received by studio panel card 210 from the video card, which may be further coupled to internal and external sources of video signals.

A TV tuner 218 also provides an NTSC signal to video connector 214 and an audio signal to an audio connector 220 on studio panel card 210. Further sources of both audio and video signals comprise a front panel 222 with a multi position selection switch 223, back panel 224, modem 226, CD player 228, and a studio PCI card 230. The studio panel card 210 provides routing and functions to allow the routing of video and audio signals between multiple sources and outputs. The multi-position selection switch 223 contains indications of input and output ports which can be selected by the user such as by rotation of the switch. The switch 223 may also be tied to a visual display indicating the pairings of input and output ports as the switch is activated such as by rotation. Separate switches, represented by reference number 223 may be used such that one selects input ports and the other selects output ports.

Figure 3:
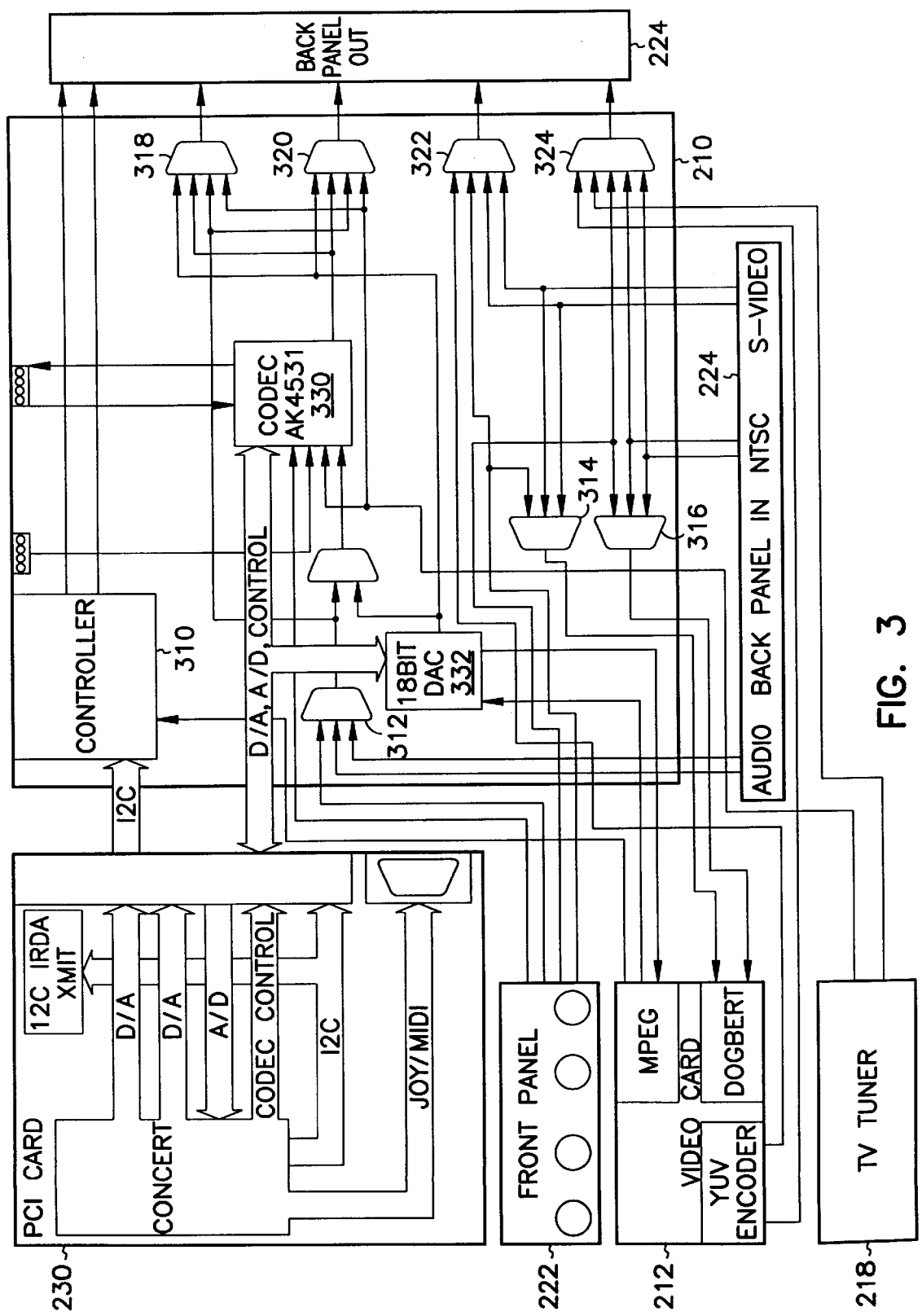
FIG. 3 is a block diagram of the personal computer of FIG. 1 illustrating control and routing of video signals associated with multiple sources of audio signals to a group of associated outputs.

FIG. 3 shows detail of the routing and control of video and audio signals associated with the studio panel card 210. The numbering of FIG. 3 is consistent with FIG. 2. Because it depicts logical routing of signals, it should be noted that there are two back panels 224, one for input signals and one for output signals, arranged in the diagram for convenience of understanding. It may actually be a single panel, or separate panels, and the exact location on the personal computer or set top box may vary as desired.

PCI card 230 is coupled to studio panel card 210 and is used to orchestrate the routing of video and audio signals by sending control signals to a controller 310 on card 210. The video card 212 is also coupled to controller 310 to provide the video card desired control of the controller. In one embodiment, the controller is an ASIC. The controller 310 operates multiple switches, 312, 314, 316, 318, 320, 322, and 324 to route video and audio signals between the sources and multiple destinations or output ports as previously described. The actual selection of the routing can be done by hardwired switches controlled by users, or by the use of software user interfaces, either by menu type selection or by other visual programming construct, such as by connecting iconic representations of input and output ports. The controller interprets such input and causes the appropriate switches to correctly route both the audio and video signals. A codec 330 is used to code and decode audio signals from multiple sources for correct playing on selected output ports. Further, a DAC 332 converts digital audio signals to analog for most audio output devices. This configuration of devices, switches and controller allows a personal computer or set top box to simultaneously receive and route multiple audio and video signals from multiple different devices to other devices. Other combinations of switches may also be used to provide for further routing capability.

The software for controlling the controller may take the form of a control application running on a personal computer system that enables the user to select an output for active signal sources or may take the form of software running within a set-top box that enables a user to select an output to which a signal is routed through a user interface. Because the associated audio and video signals may be switched together by the controller 310, the user needs only to configure the controller 310 to route a single source to a single output rather than route both the audio signal and the video signal independently. A single switch is then used to route both the audio and video signals, rather than the video switch and the audio switch both being required to route both video and audio signals.

In one embodiment, the associated audio and video outputs 305 are located near each other and given a common label such as "Audio/Video 1" so that a user may easily identify audio and video inputs that are switched together.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A personal computer comprising:
   a plurality of audio outputs;
   a plurality of video outputs; and
   a controller within the personal computer configured to receive audio and video signals from multiple sources that routes the selected audio and video signals to selected video outputs and audio outputs.

2. A personal computer comprising:
   a plurality of video outputs; and
   a controller within the personal computer configured to receive video signals from multiple sources that routes the selected video signals to selected video outputs.

3. A personal computer comprising:
   a plurality of audio outputs; and
   a controller within the personal computer configured to receive audio signals from multiple audio sources that routes the selected audio signals to selected audio outputs.

4. A personal computer comprising:
   one or more digital video sources;
   one or more digital audio sources;
   means within the personal computer for routing video signals from one or more of the digital video sources to one or more video outputs; and
   means within the personal computer for routing audio signals from one or more of the digital audio sources to one or more audio outputs.

5. The personal computer of claim 4 where a video source provides both a digital video signal and an associated digital audio signal to the controller, and the routing means routes all associated signals to a group of associated video outputs and audio outputs.

6. A personal computer comprising:
   one or more digital video sources;
   one or more digital video outputs; and
   a controller within the personal computer operable to route video signals from one or more of the digital video sources to one or more of the digital video outputs.

7. The personal computer of claim 6 wherein the user configures the controller by means of either hardware or software, such that the controller routes each of a plurality of video signals to one of a plurality of outputs.

8. The personal computer of claim 6 wherein one or more of the video outputs is connected to an input of a video device.

9. A personal computer comprising:
   one or more digital audio sources;
   one or more digital audio outputs; and
   a controller within the personal computer operable to route video signals from one or more of the digital audio sources to one or more of the digital audio outputs.

10. The personal computer of claim 9 wherein the user configures the controller by means of either hardware or software, such that the controller routes each of a plurality of audio signals to one of a plurality of outputs.

11. The personal computer of claim 9 wherein one or more of the audio outputs is connected to an input of an audio device.

12. A personal computer system comprising:
    a bus;
    a processor;
    memory coupled to the processor;
    a plurality of audio outputs;
    a plurality of video outputs; and
    a controller within the personal computer configured to receive audio and video signals from multiple sources that routes the selected audio and video signals to selected video outputs and audio outputs.

13. The personal computer system of claim 12 and further comprising a plurality of switches operated by the controller to route the audio and video signals.

14. The personal computer system of claim 12 wherein the controller is operable via software running on the processor.

15. The personal computer system of claim 12 and further comprising a video card to process digital video signals for display.

16. The personal computer system of claim 12 and further comprising a panel having a plurality of audio and video input and output ports, such input ports providing the means of receiving video and audio signals from multiple sources and such output ports further providing the plurality of video and audio outputs.

17. The personal computer system of claim 12 and further comprising a PCI card for controlling the controller.

18. The personal computer system of claim 12 wherein the video sources are selected from the group consisting of an NTSC source, a DVD source, a composite source, an MPEG source and S-video source.

19. The personal computer system of claim 12 wherein the audio sources are selected from the group consisting of a CD player, audio from a standard television, stereo audio, and audio associated with an MPEG source.

20. A personal computer system comprising:
    a processor;
    memory coupled to the processor;
    a bus coupled to the memory and to the processor;
    a plurality of audio output and input ports;
    a plurality of video output and input ports; and
    a controller within the personal computer configured to receive audio and video signals from multiple input ports, said controller routing received audio and video signals to selected video output ports and audio output ports.

21. The personal computer system of claim 20 wherein the controller routes multiple video and audio signals simultaneously.

22. The personal computer system of claim 20 wherein the controller comprises and application-specific integrated circuit.

23. The personal computer system of claim 20 wherein associated video and audio signals are routed together.

* * * * *